J. K. MAYO.
MANUFACTURE OF PIPES.
No. 92,332. Patented July 6, 1869.
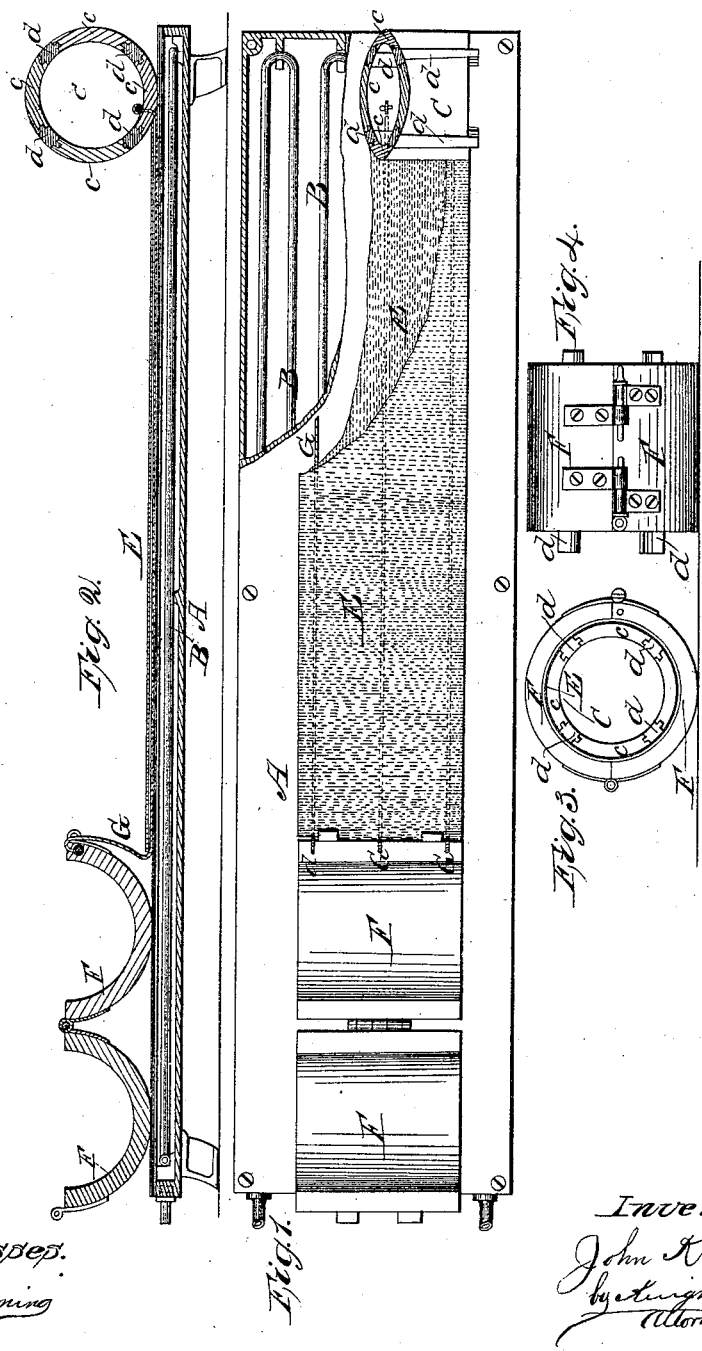
Witnesses.
W. B. Deming
John Grinnell
Inventor.
John K. Mayo
by Hughes Bro.
Attorneys

United States Patent Office.

JOHN K. MAYO, OF WILLIAMSBURG, NEW YORK.

Letters Patent No. 92,332, dated July 6, 1869.

---

IMPROVED PROCESS AND APPARATUS FOR MANUFACTURING COMPOSITION-PIPES, TUBES, BARRELS, &c.

---

The Schedule referred to in these Letters Patent and making part of the same.

---

*To all whom it may concern:*

Be it known that I, JOHN K. MAYO, of Williamsburg, in the county of Kings, and State of New York, have invented an Improved Process and Apparatus for making barrels, pipes, and other hollow articles of laminated wood; and that the following is a full and exact description of the same, reference being had to the accompanying drawings, which are made a part of this specification.

In carrying out my invention, I take wood which is cut in very thin sheets, known as scale-board or veneer, and having coated it with a suitable cement, I lay it upon a heated platform or table, in any number of thicknesses, with the grain of the contiguous layers so crossed or diversified, that they will afford mutual strength and support to each other. The platform may be heated by steam-pipes or other means, so as to prevent the cement setting too rapidly.

The scale-boards are then wound or coiled bodily upon an expansible mandrel or former. The whole is enclosed in an outside former or matrix, and the inner former expanded by wedges or other equivalent devices, so as to press the scale-board outward against the outer former, and to hold it until it is firmly set.

Small cords, attached at one end to the mandrel, and laid upon the platform beneath the scale-board, may be employed to hold and coil the latter closely upon the mandrel.

In the drawings—

Figure 1 is a plan view of an apparatus illustrating my invention, the scale-board being shown in position on the platform, in readiness for rolling on the mandrel, but portions of both scale-board and platform being removed to expose parts beneath.

Figure 2 represents a vertical longitudinal section of the same.

Figure 3 represents an end elevation, and

Figure 4, a side elevation of the combined formers, with the scale-board coiled and compressed between them.

Similar letters of reference indicate corresponding parts in the several views.

In figs. 1 and 2, the platform is represented much shorter, in proportion to the circumference of the article to be produced, than it is used in practice.

A may represent a hollow platform or table, containing a steam-coil, B, or other heating-agent.

C is a mandrel or former, which may be made hollow, and constituted of sections c c c c, separated by wedges d d d d, tongued into the sections c, and adapted, by being driven in, to expand the mandrel with great force.

The compound scale-board is shown in two layers at E E.

F is the outside former, which is made in two or more sections hinged together, and adapted to be clasped around the scale-board, after the latter is wound or coiled upon the mandrel C.

G G G represent cords, which are laid upon the platform beneath the scale-board, and connected at their respective ends to the mandrel C and clamp or outside former F, in order to assist in rolling the scale-board closely upon the mandrel.

In operation, the scale-board is first immersed in boiling-hot bitumen, pitch, tar, asphaltum, or other suitable material, which, permeating the wood, will serve to render it imperishable, and at the same time serve as a bond to unite the sheets together in a homogeneous body.

In coming from the bath of hot asphaltum or other material, the sheets pass between rollers, the pressure of which assists the penetration of the material, and at the same time removes any superfluity thereof from the surface.

The mandrel C and cords G having been placed in position, the sheets are then laid on the platform, each alternate layer being placed crosswise in respect to the grain of the preceding layer.

The asphaltum or other cement is kept soft by the warmth of the table until a sufficient number of sheets are laid, when they are tightly wound upon the mandrel C.

The outer former F is clamped over all, and the wedges d d are driven inward so as to expand the mandrel C, and forcibly compress the compound scale-board within the former.

It is then left to become cool and set, when the clamp F and mandrel C may be removed.

Cylindrical structures, of very great strength and any necessary length, are thus produced, and they are well adapted for the manufacture of barrels, by securing heads thereto in any suitable manner, or for sections of pipes for water, gas, sewers, or other uses.

I have used, with good effect, a compound scale-board of nine thicknesses, each one-twentieth of an inch in thickness, the length of the platform, and of the compound scale-board laid flat thereon, being such that the board will coil at least four times around the mandrel.

These proportions may, of course, be varied in accordance with the purpose for which the structure is required; but I consider it preferable to use less than nine thicknesses in the flat compound scale-board, and to extend the length, so that more than four coils can be made upon the mandrel.

The ends of the boards can readily be made to project successively, each beyond the other, so that no appreciable joint or seam will exist at the beginning or end of the coil.

I claim, and desire to secure by Letters Patent—

The process and apparatus, substantially as above described, for producing barrels, pipes, and other hollow articles of laminated wood.

To the above specification of my invention, I have signed my hand, this 7th day of June, 1869.

J. K. MAYO.

Witnesses:
JOHN GRINNELL,
W. B. DEMING.